(12) United States Patent
Okubo

(10) Patent No.: US 11,821,099 B2
(45) Date of Patent: Nov. 21, 2023

(54) ELECTRODE PRODUCTION METHOD

(71) Applicant: KANTO DENKA KOGYO CO., LTD., Tokyo (JP)

(72) Inventor: Kimitaka Okubo, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/823,548

(22) Filed: Aug. 31, 2022

(65) Prior Publication Data
US 2022/0411949 A1    Dec. 29, 2022

Related U.S. Application Data

(62) Division of application No. 16/613,868, filed as application No. PCT/JP2018/032649 on Sep. 3, 2018, now abandoned.

(30) Foreign Application Priority Data

Sep. 6, 2017 (JP) .................. 2017-171456

(51) Int. Cl.
| | |
|---|---|
| C25D 3/02 | (2006.01) |
| C01B 21/083 | (2006.01) |
| C25B 1/245 | (2021.01) |
| C25D 3/12 | (2006.01) |
| C25B 11/042 | (2021.01) |

(52) U.S. Cl.
CPC ............ *C25D 3/12* (2013.01); *C01B 21/0835* (2013.01); *C25B 1/245* (2013.01); *C25B 11/042* (2021.01)

(58) Field of Classification Search
None
See application file for complete search history.

(56) References Cited

U.S. PATENT DOCUMENTS

2003/0019759 A1    1/2003 Shindo et al.

FOREIGN PATENT DOCUMENTS

| CN | 104962946 A | 10/2015 |
|---|---|---|
| EP | 0 025 694 A1 | 3/1981 |
| JP | 11-335882 | 12/1999 |
| JP | 2000-103609 | 4/2000 |
| JP | 2003-268469 | 9/2003 |
| JP | 2006-336035 | 12/2006 |
| KR | 10-1200185 | 11/2012 |
| KR | 10-1217951 | 1/2013 |
| KR | 10-1570795 B1 | 11/2015 |
| WO | 02/090620 A2 | 11/2002 |

OTHER PUBLICATIONS

International Search Report, PCT/JP2018/032649, dated Oct. 2, 2018.

*Primary Examiner* — Wojciech Haske
(74) *Attorney, Agent, or Firm* — NIXON & VANDERHYE

(57) ABSTRACT

An electrode for electrolytic fluorination contains nickel as a base material with a fluorine content <1,000 ppm. Preferably, in at least a surface portion thereof, the nickel content ≥99 mass %, the iron content ≤400 ppm, the copper content ≤250 ppm, and the manganese content ≤1,000 ppm. A method for producing an electrode includes arranging a nickel base material electrode in a nickel plating bath as a cathode, and applying nickel plating to the nickel base material electrode by electrolytic nickel plating, the method including (1) using, as an anode, a nickel component deposited on a cathode, or a nickel component that has settled in a molten salt, in a process of producing nitrogen trifluoride by molten salt electrolysis using a nickel base material anode, or the nickel base material anode; or (2) using, as the cathode, the nickel base material anode.

17 Claims, No Drawings

ELECTRODE PRODUCTION METHOD

CROSS REFERENCE TO RELATED APPLICATIONS

This application is a Divisional of U.S. application Ser. No. 16/613,868, filed on Nov. 15, 2019, which is the National Phase of International Application No. PCT/JP2018/032649, filed on Sep. 3, 2018, and to Patent Application No. 2017-171456, filed in Japan on Sep. 6, 2017, all of which are hereby expressly incorporated by reference into the present application.

TECHNICAL FIELD

The present invention relates to an electrode that contains nickel as a base material and is used to fluorinate a compound by electrolysis, as well as a method for producing the same.

BACKGROUND ART

Conventionally, an electrode (hereinafter also referred to as "nickel base material electrode") that contains nickel as a base material is widely used in a process (hereinafter also referred to as "electrolytic fluorination process") of fluorinating a compound by electrolysis.

An example of the electrolytic fluorination process is the production of nitrogen trifluoride. To electrolytically produce nitrogen trifluoride, nitrogen trifluoride is produced through, for example, ammonium fluoride-hydrogen fluoride molten salt electrolysis as shown in the following reaction formulae. If carbon is used as an anode, carbon tetrafluoride is produced as a by-product, but if nickel is used as an anode, this by-product is not produced, and high-purity nitrogen trifluoride can be produced.

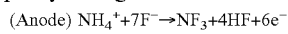

(Anode) $NH_4^+ + 7F^- \rightarrow NF_3 + 4HF + 6e^-$

(Cathode) $6H^+ + 6e^- \rightarrow 3H_2$

However, in an electrolytic fluorination process such as a nitrogen trifluoride production process, a nickel anode is dissolved through electrolysis while using several percent of the energizing quantity. Therefore, if the electrolysis is continued for a long period of time, the anode is worn and requires replacement of the electrode.

In such circumstances, there is demand for a high-quality and low-cost nickel electrode for electrolytic fluorination, with which a high current efficiency can be achieved in an electrolytic fluorination process, as well as a method for producing the same.

For example, Patent Literature 1 reports a method in which, in the above-described nitrogen trifluoride production process using molten salt electrolysis, metal nickel is used as an anode and a cathode, and the electrolysis is performed while periodically changing over the anode and the cathode with each other.

Also, Patent Literatures 2 and 3 propose, as a method for recycling a sludge that is generated during the production of nitrogen trifluoride, a method for regenerating a nickel sludge by removing acid ammonium fluoride contained in the sludge and forming an electrode plate through casting.

CITATION LIST

Patent Literature

Patent Literature 1: JP 2000-103609A
Patent Literature 2: Korean Patent No. 10-1200185
Patent Literature 3: Korean Patent No. 10-1217951

SUMMARY OF INVENTION

However, if electrolysis is carried out while periodically changing over the anode and the cathode with each other as reported in Patent Literature 1, when nickel that has been dissolved during the production of nitrogen trifluoride is being deposited on a cathode plate, the shape of the deposit is not fixed, and, in particular, the nickel may be deposited in a direction that is perpendicular to the cathode plate, into a dendritic-shaped nickel. The use of such an electrode in nitrogen trifluoride production is highly dangerous in that, for example, nitrogen trifluoride and hydrogen generated from the electrodes may mix and cause an explosion (see JP H11-335882A, for example). Moreover, nickel deposited on the cathode plate contains a fluorine-containing metal salt such as nickel fluoride, and therefore, when the cathode plate is used as the anode, problems such as lowering of the current efficiency during the production of nitrogen trifluoride may occur.

Moreover, although Patent Literatures 2 and 3 describe the removal of acid ammonium fluoride, these patent literatures make no mention whatsoever about a fluorine-containing metal salt such as nickel fluoride, and do not take into account reducing of all the fluorine components including such a metal salt. Also, according to Patent Literatures 2 and 3, the sludge needs to be melted to the melting point of nickel in order to cast an electrode from the sludge, and there are problems in that the operation is complicated, special equipment is required, and so on.

The present invention was made to address the problems with a conventional method such as those described above, and an object of the present invention thereof is to provide an electrode which, when used for electrolytic fluorination, makes it possible to conduct an electrolytic reaction with high current efficiency, at low cost, and with safety.

Another object of the present invention is to provide a method for producing an electrode with which the above-described electrode can be produced in an industrially advantageous manner while reducing the environmental burden and the production cost compared with a conventional method.

This invention provides a method for industrially advantageously producing a regenerated electrode by using the electrode worn during electrolytic fluorination process, while reducing the environmental burden and the production cost compared with a conventional method.

The inventors of the present invention have conducted in-depth research so as to achieve the above-described objects, and found that high-current-efficiency, low-cost, and safe electrolytic fluorination can be realized by using an electrode containing nickel as a base material and with controlled fluorine content in a equal to or less than a specific amount.

The inventors of the present invention also found that the above-described electrode can be produced at low cost and with reducing an environmental burden by recovering the worn nickel anode and/or the nickel component generated by dissolving of the anode, in a process of producing nitrogen trifluoride by molten salt electrolysis, and subjecting the worn nickel anode and/or the nickel component to nickel electroplating.

The present invention was accomplished based on the above-described findings. The present invention provides an electrode for fluorinating a compound by electrolysis. The electrode contains nickel as a base material, and has a fluorine content of less than 1,000 ppm on a mass basis.

Also, the present invention provides an electrode manufacturing method for performing nickel plating on a nickel base material by electrolytic nickel plating, the method including either one of (1) or (2) below:

(1) using, as a nickel component that is contained in a nickel plating bath as a soluble anode,
a nickel component that has been deposited on a cathode, or a nickel component that has settled in a molten salt, or the nickel base electrode used as the anode, in a process of producing nitrogen trifluoride by molten salt electrolysis using an anode containing nickel as a base material; and (2) using, as a nickel base material that is arranged as a cathode in the nickel plating bath, the nickel base material electrode that has been used as the anode in the process of producing nitrogen trifluoride through molten salt electrolysis.

Also, the present invention provides a method for producing a regenerated electrode by regenerating a nickel base material electrode which has been used as an anode in order to fluorinate a compound by electrolysis and in which nickel has been worn, the method having the steps of:

recovering a nickel component that has been deposited on a cathode, or a nickel component that has settled in a molten salt, in a process of producing nitrogen trifluoride by molten salt electrolysis using an anode containing nickel as a base material; and electrodepositing the recovered nickel component onto a surface of the worn nickel base material electrode to thereby regenerate the electrode.

DESCRIPTION OF EMBODIMENTS

Hereinafter, an electrode of the present invention, a method for producing the same, and a method for producing a regenerated electrode of the present invention will be described in detail. The scope of the present invention is not restricted to that which will be described below, and changes can be made thereto without departing from the gist of the present invention.

An electrode of the present invention is used in an electrolytic fluorination process, which is a process of fluorinating a compound by electrolysis. The electrode of the present invention is especially favorably used in a fluorination process in which fluorination is performed by molten salt electrolysis.

Examples of the electrolytic fluorination process are processes in which a mixture of hydrogen fluoride and a substrate compound, or an electrolytic solution containing hydrogen fluoride, is subjected to an electrolytic reaction to thereby substitute a portion of the compound, which serves as the substrate, with a fluorine atom or generate fluorine. Examples of the compound serving as the substrate include an inorganic compound such as ammonium fluoride, various organic compounds such as carboxylic acids, ketones, ethers, and acid amides, anhydrous hydrofluoric acid, and the like.

A nitrogen fluoride such as nitrogen trifluoride is obtained by an electrolytic fluorination process in which an ammonium salt such as ammonium fluoride is used as the substrate. Moreover, a fluorinated organic compound is obtained by an electrolytic fluorination process in which an organic compound is used as the substrate. Furthermore, a fluorine gas is obtained by electrolyzing a molten salt of anhydrous hydrofluoric acid and potassium fluoride or the like.

In the electrolytic fluorination process, the electrode of the present invention may be used as an anode or a cathode.

The electrode of the present invention contains nickel as a base material. Containing nickel as a base material means that nickel is contained as the main material. In the present specification, the electrode containing nickel as the base material will hereinafter be referred to simply as "nickel base material electrode". A nickel purity of 90% by mass or more corresponds to "nickel is the main material". Therefore, in the present specification, a nickel base material more specifically refers to a material that contains nickel in an amount of 90% by mass or more.

The amount of nickel in an electrode can be measured using high-frequency inductively coupled plasma emission spectrometric analysis. Specifically, an ISPS-8100 manufactured by Shimadzu Corporation can be used as the measurement apparatus. An electrode is sufficiently washed with water, alcohol, acetone, or the like and dried, and then, the entire electrode is dissolved in a mixed solution of nitric acid and hydrochloric acid and can be subjected to high-frequency inductively coupled plasma emission spectrometric analysis.

The electrode of the present invention has a fluorine content of less than 1,000 ppm by mass. This makes it possible to increase the current efficiency of electrolytic fluorination that is performed using the electrode of the present invention. The fluorine content in the electrode is more preferably 500 ppm or less, even more preferably 100 ppm or less, and especially preferably 50 ppm or less. The lower the fluorine content, the better.

An electrode having a fluorine content less than the above-described upper limit, and equal to or less than the above-described upper limit, can be obtained using a preferred method for producing an electrode of the present invention, which will be described later.

The above-described fluorine content in the electrode can be measured using ion chromatography. To measure the amount of fluorine in the electrode using ion chromatography, the surface of the electrode is sufficiently washed with water, alcohol, acetone, or the like and dried, and the entire electrode is dissolved in a mixed solution of nitric acid and hydrochloric acid and can be subjected to ion chromatography. The ion chromatography is performed by using, for example, an IonPac AS-18/AG-18 (with a length of 250 mm, an inner diameter of 4 mm, and a particle diameter of 7.5 μm) from Thermo Fisher Scientific as a column and allowing an aqueous KOH solution serving as an eluent to flow at a flow rate of 1 mL/min.

The fluorine content in the electrode of the present invention can also be measured using an X-ray microanalyzer.

An X-ray microanalyzer measures the composition at any position within an acceleration voltage range of 5 to 20 kV. The surface of the electrode is sufficiently washed with water, alcohol, acetone, or the like and dried, and the dried electrode can be subjected to the measurement with use of the X-ray microanalyzer. For example, an X-act manufactured by HORIBA, Ltd. is used as the X-ray microanalyzer. Any position on the surface of the electrode may be measured, but in the case where the electrode is produced by plating, it is preferable that the surface of a plated portion is measured. It is preferable that the fluorine content in the electrode of the present invention as measured using an X-ray microanalyzer is also equal to or less than the upper limits that have been described above as preferable fluorine contents. That is to say, the fluorine content as measured using an X-ray microanalyzer is preferably 1,000 ppm or less on a mass basis, more preferably 100 ppm or less, and especially preferably 50 ppm or less.

Moreover, the presence or absence of a fluorine component such as nickel fluoride can also be confirmed using X-ray diffraction analysis. For example, an X-ray diffractometer (D8 ADVANCE/V) manufactured by Bruker AXS is used to perform the X-ray diffraction measurement. A sample to be subjected to the X-ray diffraction measurement is manually or mechanically prepared by pulverizing.

The electrode has a high nickel purity, and thus, when the electrode is used as the anode in the electrolytic fluorination process, an electrode component is suppressed from dissolving, which results in a prolonged life. Thus, electrode replacement operations can be reduced, and the current efficiency during electrolytic fluorination and the purity of a fluoride to be generated can be increased. Moreover, a high nickel purity of the electrode makes it possible to prevent the electrolyte from being contaminated during electrolytic fluorination. Furthermore, as will be described later, in the case where the electrode of the present invention is produced by nickel plating, the nickel plating bath can also be prevented from being contaminated.

From these points of view, it is preferable that the nickel purity of the electrode of the present invention is 90 mass % or more, and, in particular, it is preferable that the nickel purity is 99 mass % or more, from the standpoint of increasing the current efficiency in the electrolytic fluorination process, and more preferably the nickel purity is 99.5 mass % or more. In the present invention, it is sufficient that the nickel purity here is achieved in a surface portion, because a component that is measured in the surface portion can be used as an indicator of the composition of the electrode. The surface portion as used herein refers to a portion spanning from the surface to a depth of 10 μm or less.

The purity of nickel in the surface portion of the electrode can be measured using high-frequency inductively coupled plasma emission spectrometric analysis. For example, an ISPS-8100 manufactured by Shimadzu Corporation can be used as the measurement apparatus. The electrode is sufficiently washed with water, alcohol, acetone, or the like and dried, then the surface portion is separated, and the separated piece is dissolved in a mixed solution of nitric acid and hydrochloric acid and can be subjected to high-frequency inductively coupled plasma emission spectrometric analysis. Any portion on the surface may be separated, but in the case where the electrode is produced by plating, it is preferable that a surface portion of a plated portion is separated.

In light of an increase in the current efficiency in the electrolytic fluorination process, the purity of a fluoride to be generated, the prevention of contamination of the electrolyte, and the like, it is preferable that the amount of an element contained in the electrode of the present invention other than nickel is low.

For example, from the standpoint of suppressing the generation of a sludge in the electrolyte, the iron content in the electrode of the present invention is preferably 400 ppm or less on a mass basis, more preferably 200 ppm or less on a mass basis, and especially preferably 100 ppm or less on a mass basis. The lower the iron content, the better, but the detection limit is 3 ppm by mass. It is sufficient that the above-described iron content is achieved in a surface portion of the electrode.

From a similar standpoint, the copper content in the electrode of the present invention is preferably 250 ppm or less on a mass basis, more preferably 200 ppm or less on a mass basis, and especially preferably 100 ppm or less on a mass basis, from the standpoint of preventing contamination of the electrolyte. The lower the copper content, the better, but the detection limit is 1 ppm by mass. It is sufficient that the above-described copper content is achieved in a surface portion of the electrode.

From a similar standpoint, the manganese content in the electrode of the present invention is preferably 1,000 ppm or less on a mass basis, more preferably 800 p ppm or less on a mass basis, and especially preferably 500 ppm or less on a mass basis, from the standpoint of preventing contamination of the electrolyte. The lower the manganese content, the better, but the detection limit is 1 ppm by mass. It is sufficient that the above-described manganese content is achieved in a surface portion of the electrode.

Furthermore, it is preferable that the silicon content in the electrode of the present invention is 300 ppm or less on a mass basis, from the standpoints of increasing the current efficiency in the electrolytic fluorination process and suppressing a decrease in the purity of a fluoride to be generated. From these standpoints, the silicon content is more preferably 100 ppm or less on a mass basis, and especially preferably 50 ppm or less on a mass basis. The detection limit of silicon is 10 ppm by mass. It is sufficient that the above-described silicon content is achieved in a surface portion of the electrode.

Moreover, it is preferable that the electrode of the present invention has a sulfur content of 100 ppm or less on a mass basis, from the standpoints of increasing the current efficiency in the electrolytic fluorination process and suppressing a decrease in the purity of a fluoride to be produced. From these standpoints, the sulfur content is more preferably 50 ppm or less on a mass basis, and especially preferably 10 ppm or less on a mass basis. The detection limit of sulfur in the electrode is 10 ppm by mass. It is sufficient that the above-described sulfur content is achieved in a surface portion of the electrode.

An electrode having a nickel purity equal to or higher than the above-described lower limit and having iron, copper, manganese, silicon, and sulfur contents equal to or less than the above-described respective upper limits can be obtained using a preferred method for producing an electrode, which will be described later.

In the present specification, the above-described iron, copper, manganese, silicon, and sulfur contents can be measured using high-frequency inductively coupled plasma emission spectrometric analysis. For example, an ISPS-8100 manufactured by Shimadzu Corporation is used as the measurement apparatus. The electrode is sufficiently washed with water, alcohol, acetone, or the like and dried, then a surface portion is separated therefrom, and the separated piece is dissolved in a mixed solution of nitric acid and hydrochloric acid and can be subjected to high-frequency inductively coupled plasma emission spectrometric analysis. Any portion on the surface may be separated, but in the case where the electrode is produced by plating, it is preferable that a surface portion of a plated portion is separated.

Furthermore, in the case where the electrode of the present invention is produced by applying nickel plating to a nickel base material, the surface portion to be separated is not limited to a portion spanning from the surface to a depth of 10 μm, and it is also possible to entirely or partially separate a portion that has been electrodeposited by plating from the electrode and subject the separated portion to high-frequency inductively coupled plasma emission spectrometric analysis using the above-described method. The iron, copper, manganese, silicon, and sulfur contents that are measured in that case are also equal to or less than the respective upper limits that have been described as preferred iron, copper, manganese, silicon, and sulfur contents. That is to say, when measurement is performed in the above-described manner, it is preferable that the iron content is 400 ppm or less, more specifically 200 ppm or less, and even more specifically 100 ppm or less; it is preferable that the copper content is 250 ppm or less, more specifically 200 ppm or less, and even more specifically 100 ppm or less; it is preferable that the manganese content is 1,000 ppm or less, more specifically 800 ppm or less, and even more specifically 500 ppm or less; it is preferable that the silicon content is 300 ppm or less, more specifically 100 ppm or less, and even more specifically 50 ppm or less; and it is preferable that the sulfur content is 100 ppm or less, more specifically 50 ppm or less, and even more specifically 10 ppm or less.

Note that the amount of the portion that has been electrodeposited by plating can be obtained based on a change in weight, or based on an amount of change in thickness or the like.

The shape of the electrode of the present invention is not limited to a specific shape, and may be any of a plate-like shape, a net-like shape (mesh), a lattice-like shape, a perforated surface-like shape, a comb-like shape, a zigzag shape, a reed screen-like shape, a flocculent shape, a foil-like shape, a bar-like shape, a tubular shape, a shape obtained by forming a hole with use of a die of a punching press, and the like.

Hereinafter, a preferred method for producing the electrode of the present invention will be described.

The present production method is a method for producing an electrode by disposing a nickel base material in a nickel plating bath as a cathode and applying nickel plating to the nickel base material by electrolytic nickel plating, the method including (1) or (2) below:

(1) using, as a nickel component that is contained in the nickel plating bath as a soluble anode,
a nickel component (A) that has been deposited on a cathode, or a nickel component (B) that has settled in a molten salt, in a process of producing nitrogen trifluoride by molten salt electrolysis with use of an anode containing nickel as a base material, or a nickel base material electrode (C) that has been used as the anode in the nitrogen trifluoride production process; and (2) using, as the nickel base material that is disposed in the nickel plating bath as the cathode, the nickel base material electrode (C) that has been used as the anode in the process of producing nitrogen trifluoride by molten salt electrolysis.

Examples of the shape of the nickel base material that is disposed in the nickel plating bath as the cathode include shapes that are similar to those listed above as examples of the shape of the electrode.

A fluorine component, such as nickel fluoride, contained in the nickel base material electrode that has been used in the process of producing nitrogen trifluoride through molten salt electrolysis is unlikely to dissolve in the nickel plating bath. For this reason, with the present production method, a nickel base material electrode having a fluorine content equal to or less than a specific amount can be easily obtained. Moreover, with the present production method, contamination of common nickel impurities, such as iron, copper, manganese, silicon, and sulfur, is easily prevented using differences in oxidation-reduction potential from that of nickel, and thus, an electrode in which the amount of these impurities is low in at least a surface portion thereof can be produced.

The electrode of the present invention that is obtained using the present production method is preferable in that both an increase in the current efficiency during use of the electrode of the present invention and a reduction in the cost and the environmental burden during use of the electrode of the present invention can be achieved.

From the standpoint of obtaining a high-performance electrode, it is preferable that the nickel base material that is disposed in the nickel plating bath as the cathode has a nickel purity of 90 mass % or more, more preferably 99 mass % or more, and even more preferably 99.5 mass % or more.

In the production of nitrogen trifluoride by molten salt electrolysis with use of a nickel base material electrode as the anode, nickel of the nickel base material electrode is worn, and a nickel component reduced at the cathode is deposited thereon. Moreover, the nickel component settles in the molten salt and constitutes a sludge. The present production method uses at least one of the nickel component (A) (including the cathode itself and hereinafter also referred to simply as "deposited nickel component (A)") that has been deposited on the cathode during the above-described nitrogen trifluoride production process, the nickel component (B) (hereinafter also referred to simply as "settling nickel component (B)") that has settled in the molten salt during the above-described nitrogen trifluoride production process, and the nickel base material electrode (C) that has been used as the anode during the above-described nitrogen trifluoride production process. Usually, the nickel base material electrode (C) that has been used as the anode has been partially dissolved and worn as the molten salt electrolysis process proceeded. For this reason, in the following description, the nickel base material electrode (C) that has been used as the anode will also be referred to as "worn electrode (C)". An electrode that is produced using the present production method will also be referred to as "regenerated electrode".

In the electrode production process of the present invention, the deposited nickel component (A) may be arranged in the nickel plating bath as the soluble anode to dissolve the deposited nickel component (A) into the plating bath and electrodeposit nickel onto a cathode plate. Usually, if a nickel base material is used as the cathode in the production of nitrogen trifluoride, most of nickel dissolved from the nickel base material anode is reduced at the surface of the nickel base material cathode and deposited on the surface of the cathode. Therefore, the nickel recycling rate can be increased by performing electrolytic nickel plating using such a nickel component as the soluble anode.

In the case where the above-described nickel component (A) that has been deposited on the cathode in the production of the nitrogen trifluoride is separated from the cathode and used as the soluble anode, even when the separated nickel piece is charged into a titanium basket as is, and immersed in the nickel plating bath, an electrode of the present invention having a low fluorine content can be obtained. However, from the standpoints of further reducing the fluorine content of an electrode to be obtained and preventing the plating bath from being contaminated, it is also possible that a fluorine component, such as nickel fluoride, is removed from the separated nickel piece before the nickel piece is charged into the titanium basket and immersed in the nickel plating bath. This removing process can be realized by a treatment such as washing with water or hot water, or neutralizing and washing with an aqueous alkali solution.

Usually, an additive such as sulfur is added to nickel for use as a soluble anode in nickel plating in order to improve the solubility thereof. However, the nickel component that is used as the soluble anode in the present invention, in particular, the above-described nickel components (A) and (B) do not require any additive for improving the solubility, and can be used as is. For example, the sulfur content in the nickel component is preferably 0.01 mass % or less and more preferably 0.005 mass % or less. This sulfur content can be measured using a similar method to the method that has been described above as a method for measuring sulfur in the electrode of the present invention.

In the case where a nickel base material cathode is used as the cathode in the production of nitrogen trifluoride, instead of, or in addition to, separating the nickel component (A) that has been deposited on the cathode and collecting it, the nickel base material cathode on which nickel has been deposited during the production of nitrogen trifluoride can also be used as it is as an electrode for dissolved nickel for use in the production of a regenerated electrode. At this time, the probability of contamination of the plating bath with an impurity such as a fluorine component increases, but as described above, the fluorine component such as nickel fluoride is insoluble in the plating bath. Therefore, it is possible to repeatedly use the plating bath by removing the fluorine component with use of a filter.

Moreover, in the present invention, the nickel component (B) that has settled in the molten salt during the production of nitrogen trifluoride may also be used as the soluble anode in electrolytic nickel plating. In this case, it is preferable that after the treatment such as washing with water or hot water, or neutralizing and washing with an aqueous alkali solution, the settling nickel component is solidified. Examples of the method for solidifying the settling nickel component include heating and drying under an inert gas atmosphere or in vacuum.

In the electrode production process of the present invention, the above-described worn electrode (C) can be arranged in the nickel plating bath as the soluble anode in exactly the same form as has been used in the production of nitrogen trifluoride, or can be arranged as the soluble anode in a state in which the worn electrode (C) is charged, as a nickel piece, into a titanium basket and immersed in the nickel plating bath.

In the electrode production process of the present invention, the above-described worn electrode (C) can also be arranged in the nickel plating bath as the cathode and thereby used as a base material of a regenerated electrode. Usually, in electrolysis, current is concentrated at the end of the electrode, and thus, during the production of nitrogen trifluoride, if electrolysis is continued for a long period of time, the anode is dissolved from its end portion, resulting in a decrease in the area of the electrode. For this reason, in the case where the worn electrode (C) is used as the base material of a regenerated electrode, it is preferable that, during the production of nitrogen trifluoride, the electrolysis is ended in a state in which 20% or more, or more preferably 40% or more, of the area of the electrode is kept unused, in order to control the shape of the electrode after the electrodeposition.

In particular, it is most preferable that the above-described nickel component (A) that has been deposited on the cathode is used as the soluble anode in electrolytic nickel plating.

Table 1 below shows examples of typical combinations of the cathode and the anode in electrolytic nickel plating that is performed in the production method of the present invention. In the present invention, any of the combinations (1) to (4) below can be adopted.

TABLE 1

| | Anode during plating | Cathode during plating |
|---|---|---|
| (1) | Worn electrode (C) | Worn electrode (C) or new nickel |
| (2) | Deposited nickel component (A) (Component separated from cathode) | Worn electrode (C) or new nickel |
| (3) | Deposited nickel component (A) (Nickel base material cathode itself used in NF3 production) | Worn electrode (C) or new nickel |
| (4) | New nickel | Worn electrode (C) |

Among these combinations, from the standpoint of recycling, to the greatest extent possible, a nickel component that has been worn and dissolved during the production of nitrogen trifluoride, it is preferable that the worn electrode (C) that has been used in the production of nitrogen trifluoride is used as the cathode during plating, and the deposited nickel component (A), or the nickel component (B) that has settled in the molten salt, in the production of nitrogen trifluoride is used as the soluble anode during plating. From the standpoints of making it possible to easily regenerate a high-purity nickel base material electrode, minimizing the energy that is used to produce a regenerated electrode, and, furthermore, reducing the nitrogen trifluoride production cost, it is preferable that the above-described worn electrode (C) is used as the cathode during plating, and the above-described deposited nickel component (A) is used as the soluble anode during plating.

With regard to electrolytic nickel plating, an electrode having a uniform surface can be easily obtained by setting the pH of the nickel plating bath and the current density to be within the following specific ranges, respectively. It is preferable that each of electrodes has a uniform surface, because, for example, when the electrode is used to produce nitrogen trifluoride, nitrogen trifluoride and hydrogen generated from each electrode are likely to be prevented from mixing with each other and causing an explosion. The cathode may be only partially immersed in the plating bath, or may be entirely immersed in the plating bath.

The pH of the nickel plating bath is preferably from 3.0 to 6.0, and more preferably from 4.5 to 5.5. When the pH is from 4.5 to 5.5, the buffering effect of boric acid is strong. A pH of 6.0 or less makes it possible to prevent nickel hydroxide from being generated and causing precipitation. A pH of 3.0 or more increases the conductivity and thus has the advantage of being able to suppress poor electrodeposition.

The current density in the electrolytic nickel plating bath is preferably from 1.0 to 10.0 $A/dm^2$, and more preferably from 1.0 to 2.0 $A/dm^2$. A current density of 1.0 $A/dm^2$ or more makes it possible to reduce the electrolysis time and thus increase the production efficiency. A current density of 2.0 $A/dm^2$ or less prevents the deposition from being concentrated at the end of the cathode and thus makes it possible to produce a regenerated electrode having a uniform surface and a uniform thickness.

With regard to electrolytic nickel plating, it is preferable to further set the bath temperature and the nickel ion concentration in the nickel plating bath to be within the following specific ranges, respectively, because this makes it possible to even more easily obtain an electrode having a uniform surface.

The bath temperature in the electrolytic nickel plating bath is preferably from 40° C. to 60° C., and more preferably from 45° C. to 55° C. A bath temperature of 40° C. or more makes it possible to prevent the deposition of nickel sulfate. A bath temperature of 60° C. or less prevents water from evaporating, makes it easy to control the electrolysis conditions, and, furthermore, is likely to prevent the deterioration of a resin that is used for the electrolytic cell, and therefore, is preferable.

The nickel ion concentration in the nickel plating bath is preferably from 40 to 100 g/L, and more preferably from 65 to 85 g/L. A nickel ion concentration of 40 g/L or more makes it possible to reduce the production time, and also has the advantages of increasing the current efficiency and suppressing an increase in voltage. A nickel ion concentration of 100 g/L or less makes it easy to obtain an electrode having a uniform surface.

Furthermore, from the standpoint of reducing the fluorine content in an electrode to be obtained, the fluorine ion concentration in the nickel plating bath is preferably 10 g/L or less, more preferably 5 g/L or less, and especially preferably 1 g/L or less. This fluorine ion concentration refers to the concentration excluding a component, such as nickel fluoride, that is insoluble in the plating bath. The fluorine ion concentration in the plating bath can be measured using ion chromatography, and is preferably measured at the end of plating.

The fluorine ion concentration in the nickel plating bath is measured using ion chromatography. The measurement using ion chromatography is performed by using, for example, an IonPac AS-18/AG-18 (with a length of 250 mm, an inner diameter of 4 mm, and a particle diameter of 7.5 μm) from Thermo Fisher Scientific as the column, and allowing an aqueous KOH solution serving as the eluent to flow at a flow rate of 1 mL/min.

In the present invention, the type of the plating bath is not limited to a specific type, and a mixed solution (Watts bath) of nickel sulfate and nickel chloride, a nickel sulfamate bath, or the like can be used. With regard to the electrodeposition conditions, such as temperature, pH, current density, and the like, the above-described respective ranges are preferable, and conditions suited to the adopted type of plating bath can be used. For example, in the case where a Watts bath is used as the plating bath, it is preferable to perform the electrolysis at a temperature of 45 to 60° C., a pH of 3.5 to 4.5, and a current density of less than 2 A/dm².

With the above-described production method of the present invention, an electrode having a uniform electrode surface and stable quality can be easily obtained.

Compared with an electrode that is produced using a method other than the production method of the present invention, an electrode that is produced using the production method of the present invention has a higher effect of increasing the current efficiency when used in electrolytic fluorination, and makes it possible to reduce the cost and the environmental burden of electrolytic fluorination.

The electrode (regenerated electrode) of the present invention that is obtained in the above-described manner can be used in the above-described various types of electrolytic fluorination processes. In particular, it is preferable that the electrode of the present invention is arranged in an electrolytic cell that contains a molten salt containing ammonium fluoride and hydrogen fluoride and used to produce nitrogen trifluoride by electrolysis, because this usage has the advantage of making it possible to use a high-quality regenerated electrode in an electrolytic process with respect to which there is strong demand for use of a nickel electrode. After the regeneration, the anode that has been used in an electrolytic fluorination process such as the production of nitrogen trifluoride and worn again, as well as the nickel component that has been deposited on the cathode can be repeatedly regenerated and reused using the above-described method for producing an electrode of the present invention.

The electrode of the present invention that is produced using the above-described production method may be used as either of the anode and the cathode in an electrolytic fluorination process, but it is preferable that the electrode is used as the anode, because of the economic advantage that is obtained by repeatedly regenerating the anode. In this case, a material commonly used in an electrolytic fluorination process, such as the production of a nitrogen trifluoride gas, can be used, without limitation, as the cathode that is used in the electrolytic fluorination process. For example, iron, steel, nickel, Monel, and the like can be used. In order to efficiently recover a nickel component dissolved from the nickel base material anode and suppress the generation of a nickel sludge, it is preferable to use the nickel base material electrode as the cathode in the electrolytic fluorination process.

For example, in the case where the electrode of the present invention is used to produce nitrogen trifluoride by electrolysis of a molten salt containing an ammonium salt and hydrogen fluoride, any electrolytic cell with which nitrogen trifluoride can be produced can be used as the electrolytic cell, and the electrolytic cell need not have any special structure. However, in order to efficiently recover nickel that has been dissolved from the anode and suppress the generation of a nickel sludge, it is preferable that an inner surface of the electrolytic cell is coated with a fluororesin such as polytetrafluoroethylene (PTFE) or perfluoroalkoxy alkane (PFA).

For example, in the case where the electrode of the present invention is used to produce nitrogen trifluoride by electrolysis of a molten salt containing an ammonium salt and hydrogen fluoride, usually, a molten salt containing ammonium fluoride and hydrogen fluoride is used as the electrolyte. Examples of the method for preparing the electrolyte include a method in which the electrolyte is prepared by directly mixing an ammonia gas and anhydrous hydrogen fluoride, a method in which the electrolyte is prepared by mixing ammonium fluoride or acidic ammonium fluoride and anhydrous hydrogen fluoride, and the like.

With respect to the composition of the electrolyte, it is preferable that the molar ratio of $HF/NH_4F$ is from 1.5 to 2. Setting this molar ratio to be 1.5 or more makes it possible to prevent the electrolytic voltage from increasing and prevent the current efficiency of production of nitrogen trifluoride from decreasing, and therefore, is preferable. Also, setting this molar ratio to be 2 or less makes it possible to prevent a fluorine gas from being generated, prevent the vapor pressure of HF from increasing, and suppress the amount of loss of HF that is entrained by a generated gas and discharged to the outside of the system, and therefore, is preferable.

When producing nitrogen trifluoride by electrolysis of a molten salt containing ammonium and hydrogen fluoride with use of the above-described method, it is preferable to set the current density at 1 to 20 A/dm² and the reaction temperature at 100 to 130° C., because this makes it possible to efficiently produce nitrogen trifluoride.

It is preferable that a regenerated electrode obtained by electrodepositing nickel onto the above-described worn electrode (C) by electrolytic nickel plating has a mass that is larger than that of the worn electrode (C) prior to the regeneration by 10 mass % or more. Moreover, it is also preferable that the mass of the regenerated electrode has been increased by electrolytic nickel plating so as to be equal to the initial mass of the worn electrode (C) prior to being worn.

EXAMPLES

Hereinafter, the present invention will be described in greater detail using examples. However, the present invention is not limited to the examples below.

Example 1

(1) Recovery of Nickel Component (Production of Nitrogen Trifluoride)

Nickel plates having a nickel purity of 99 mass % were used as an anode and a cathode, respectively. An ammonium fluoride-hydrogen fluoride molten salt $NH_4F \cdot 1.8$ HF was prepared from ammonia and anhydrous hydrofluoric acid in an electrolytic cell. Then, molten salt electrolysis was carried out under the conditions at a temperature of 100° C. and a current density of 8 A/dm$^2$ to produce nitrogen trifluoride with a current efficiency of 65%. A nickel component deposited on the cathode during the production of nitrogen trifluoride was separated and recovered. The area of the anode after the production of nitrogen trifluoride was 70% or more of the area of the electrode before use.

(2) Production of Regenerated Electrode

First, 170 g of nickel sulfate hexahydrate, 32 g of nickel chloride hexahydrate, and 21 g of boric acid were dissolved in 0.7 L of pure water to prepare a plating bath. A nickel electrode having a nickel purity of 99 mass % was arranged as a cathode such that the nickel electrode was entirely immersed in the plating bath, and the separated nickel piece (amount of sulfur: 0.005 mass % or less) recovered in (1) was charged into a titanium basket and arranged as an anode. An electrolytic reaction was carried out for 6 hours at a bath temperature of 45° C., pH 4, and a current density of 2.0 A/dm$^2$ to apply nickel plating to the surface of the nickel plate serving as the cathode, and thus, a nickel electrode was produced with a current efficiency of 99%. The fluorine ion concentration in the plating bath at the end of plating was measured using ion chromatography under the above-described conditions and found to be 0.1 g/L. A portion of the produced electrode was analyzed by X-ray diffraction and identified as metal nickel, while no fluorine components such as nickel fluoride were detected. An analysis was performed using an X-ray microanalyzer (acceleration voltage: 20 kV) under the above-described conditions, and fluorine was not detected (the fluorine detection limit of the X-ray microanalyzer: 100 ppm by mass). The entire electrode was dissolved in nitric acid and hydrochloric acid and subjected to measurement using ion chromatography under the above-described conditions, and it was confirmed from the fluorine ion concentration in the solution that the fluorine content in the electrode was 100 ppm by mass or less.

Moreover, the composition of a surface portion of the produced regenerated electrode was measured using high-frequency inductively coupled plasma emission spectrometer under the above-described conditions. Table 2 shows the results. Note that the entire plated portion was also subjected to high-frequency inductively coupled plasma emission spectrometric analysis in a similar manner, and values similar to those shown in Table 2 were obtained.

TABLE 2

| | Ni mass % | Fe | Si | S | Mn | Cu |
| --- | --- | --- | --- | --- | --- | --- |
| | | | ppm (by mass) | | | |
| Example 1 | >99.9 | 100 | <10 | 20 | 400 | 50 |
| Nickel plate prior to plating | 99.6 | 900 | 1100 | <100 | 2200 | <100 |

Evaluation Example 1 (Production of Nitrogen Trifluoride)

An ammonium fluoride-hydrogen fluoride molten salt $NH_4F \cdot 1.8$ HF was prepared from ammonia and anhydrous hydrofluoric acid in an electrolytic cell. The regenerated electrode produced in Example 1 was arranged in the electrolytic cell as an anode, and a nickel electrode having a nickel purity of 99 mass % was arranged therein as a cathode. An electrolytic reaction was carried out at a temperature of 120° C. and a current density of 5 A/dm$^2$, and thus, nitrogen trifluoride was obtained with a current efficiency of 70%.

Example 2

(1) Recovery of Nickel Component (Production of Nitrogen Trifluoride)

Nickel electrodes having a nickel purity of 99 mass % were used as an anode and a cathode, respectively. An ammonium fluoride-hydrogen fluoride molten salt $NH_4F \cdot 1.8$ HF was prepared from ammonia and anhydrous hydrofluoric acid in an electrolytic cell. Then, molten salt electrolysis was carried out under the conditions at a temperature of 120° C. and a current density of 5 A/dm$^2$ to produce nitrogen trifluoride with a current efficiency of 65%. A nickel component deposited on the cathode during the production of nitrogen trifluoride was separated and recovered. The area of the anode after the production of nitrogen trifluoride was 50% or more of the area of the electrode before use.

(2) Production of Regenerated Electrode

In a 150-L electrolytic cell whose inner surface was coated with Teflon (registered trademark), 36.1 kg of nickel sulfate hexahydrate, 7.1 kg of nickel chloride hexahydrate, and 5.0 kg of boric acid were dissolved in pure water to prepare 150 L of a plating bath. The worn electrode used as the anode in (1) and having a thickness of 1 cm was arranged as a cathode such that the electrode was entirely immersed in the plating bath, and the separated nickel piece (amount of sulfur: 0.005 mass % or less) recovered in (1) was used as an anode. An electrolytic reaction was carried out for 65 hours at a bath temperature of 50° C., pH 4, and a current density of 1.5 A/dm$^2$ to apply nickel plating to the surface of the worn electrode serving as the cathode, and thus, a regenerated electrode having a thickness of 1.5 cm was produced with a current efficiency of 99%. The fluorine ion concentration in the plating bath at the end of plating was measured using ion chromatography under the above-described conditions and found to be 0.5 g/L. The mass of the obtained regenerated electrode was larger than the mass of the worn electrode, which was used as the cathode, by 50%. A portion of the produced regenerated electrode was analyzed by X-ray diffraction and identified as metal nickel, while no fluorine components such as nickel fluoride were detected. An analysis was performed using an X-ray microanalyzer (acceleration voltage: 20 kV) under the above-described conditions, and fluorine was not detected (the fluorine detection limit of the X-ray microanalyzer: 100 ppm by mass). The entire electrode was dissolved in nitric acid and hydrochloric acid and subjected to measurement using ion chromatography under the above-described conditions, and it was confirmed from the fluorine ion concentration in the solution that the fluorine content in the electrode was 100 ppm by mass or less.

Moreover, the composition of a surface portion of the produced regenerated electrode was measured using high-frequency inductively coupled plasma emission spectrometer under the above-described conditions. Table 3 shows the results. Note that the entire plated portion was also subjected to high-frequency inductively coupled plasma emission spectrometric analysis in a similar manner, and values similar to those shown in Table 3 were obtained.

TABLE 3

|  | Ni mass % | Fe | Si | S | Mn | Cu |
|---|---|---|---|---|---|---|
|  |  | ppm (by mass) | | | | |
| Example 2 | >99.9 | 80 | <10 | <10 | 300 | 30 |
| Worn electrode prior to plating | 99.6 | 800 | 1000 | <100 | 2200 | <100 |

Evaluation Example 2 (Production of Nitrogen Trifluoride)

An ammonium fluoride-hydrogen fluoride molten salt $NH_4F \cdot 1.8\ HF$ was prepared from ammonia and anhydrous hydrofluoric acid in an electrolytic cell. The regenerated electrode produced in Example 2 was arranged in the electrolytic cell as an anode, and the cathode used in (1) of Example 2, which had a nickel purity of 99 mass % and from which the nickel piece was separated, was arranged therein as a cathode. Then, an electrolytic reaction was carried out at a temperature of 120° C. and a current density of 10 $A/dm^2$, and thus, nitrogen trifluoride was obtained with a current efficiency of 75%.

Example 3

(1) Recovery of Nickel Component (Production of Nitrogen Trifluoride)
A similar procedure to that of Example 2 was performed.
(2) Production of Regenerated Electrode
A regenerated electrode was produced under the same conditions as those of Example 2, except that instead of the recovered nickel component used in (2) of Example 2, the cathode used in the production of nitrogen trifluoride in (1) of Example 3 was used as the anode made of nickel to be dissolved. The mass of the obtained regenerated electrode was larger than the mass of the worn electrode, which was used as the cathode, by 90%. The fluorine ion concentration in the plating bath at the end of plating was measured using ion chromatography under the above-described conditions and found to be 0.8 g/L. A portion of the produced regenerated electrode was analyzed by X-ray diffraction and identified as metal nickel, while no fluorine components such as nickel fluoride were detected. An analysis was performed using an X-ray microanalyzer (acceleration voltage: 20 kV) under the above-described conditions, and fluorine was not detected (the fluorine detection limit of the X-ray microanalyzer: 100 ppm by mass). The entire electrode was dissolved in nitric acid and hydrochloric acid and subjected to measurement using ion chromatography under the above-described conditions, and similarly it was confirmed from the fluorine ion concentration in the solution that the fluorine content in the electrode was 100 ppm by mass or less.

Moreover, the composition of a surface portion of the produced regenerated electrode was measured using high-frequency inductively coupled plasma emission spectrometer under the above-described conditions. Table 4 shows the results. Note that the entire plated portion was also subjected to high-frequency inductively coupled plasma emission spectrometric analysis in a similar manner, and values similar to those shown in Table 4 were obtained.

TABLE 4

|  | Ni mass % | Fe | Si | S | Mn | Cu |
|---|---|---|---|---|---|---|
|  |  | ppm (by mass) | | | | |
| Example 3 | >99.9 | 50 | <10 | <10 | 30 | 3 |
| Worn electrode prior to plating | 99.6 | 800 | 600 | <20 | 800 | 100 |

Evaluation Example 3 (Production of Nitrogen Trifluoride)

Nitrogen trifluoride was produced under the same conditions as those of Evaluation Example 2, except that the regenerated electrode produced in Example 3 was placed as the anode in the electrolytic cell for producing nitrogen trifluoride, and thus, nitrogen trifluoride was obtained with a current efficiency of 74%.

Comparative Example 1—Comparative Evaluation Example 1

An ammonium fluoride-hydrogen fluoride molten salt $NH_4F \cdot 1.8\ HF$ was prepared from ammonia and anhydrous hydrofluoric acid in an electrolytic cell, and electrolysis was carried out for 30 days using nickel electrodes as both an anode and a cathode. The fluorine content in the cathode was measured using an X-ray microanalyzer (acceleration voltage: 20 kV) under the above-described conditions and found to be 100,000 ppm by mass, and thus, it was found that a nickel component deposited on the cathode contained fluorine in a large amount. Based on an analysis that was performed using X-ray diffraction, most of this fluorine content was presumed to be constituted by nickel fluoride.

Moreover, the entire electrode was dissolved in nitric acid and hydrochloric acid and subjected to measurement using ion chromatography under the above-described conditions, and it was confirmed from the fluorine ion concentration in the solution that the fluorine content in the electrode was 20,000 ppm by mass.

When the anode and the cathode were changed over with each other, and electrolysis was resumed, the voltage at a current density of 5 $A/dm^2$ was higher than the usual voltage by 2 V, and the current efficiency was 60%.

Evaluation Example 4 (Production of Fluorine Gas)

A potassium fluoride-hydrogen fluoride molten salt $KF \cdot 2.0\ HF$ was prepared in an electrolytic cell. A carbon electrode was used as an anode, and the regenerated nickel electrode produced in Example 2 was used as a cathode.

Electrolysis was carried out for 30 days at a current density of 8 A/dm², and thus, a fluorine gas was obtained with a current efficiency of 95%.

INDUSTRIAL APPLICABILITY

With the electrode of the present invention, it is possible to realize electrolytic fluorination with high current efficiency, at low cost, and with safety.

Moreover, with the method for producing an electrode of the present invention, it is possible to produce the above-described electrode in an industrially advantageous manner while reducing the environmental burden and the production cost.

Moreover, with the method for producing a regenerated electrode of the present invention, it is possible to regenerate an electrode that has been worn in an electrolytic fluorination process, in an industrially advantageous manner while reducing the environmental burden and the production cost compared with a conventional method.

The method for producing an electrode, and the method for producing a regenerated electrode, of the present invention use, in the production of a nickel electrode for electrolytic fluorination, a nickel worn electrode that has been used for electrolytic fluorination or a dissolved component thereof, thereby making it possible not only to significantly reduce the cost of electrolytic fluorination but also to reduce a large amount of waste, and therefore, are extremely preferable from an environmental point of view.

The invention claimed is:

1. A method for producing an electrode for fluorinating a compound by electrolysis, the electrode containing nickel as a base material and having a fluorine content of less than 1,000 ppm, and
    the method comprising subjecting, to electrolytic nickel plating, (i) a nickel component that has been deposited on a cathode in a process of producing nitrogen trifluoride by molten salt electrolysis with use of an anode containing nickel as a base material, or (ii) an anode containing nickel as a base material that has been worn in a process of producing nitrogen trifluoride by molten salt electrolysis;
    thereby to obtain said electrode.

2. The method for producing an electrode according to claim 1, wherein the electrode has, in at least a surface portion thereof, a nickel content of 99 mass % or more, an iron content of 400 ppm or less, a copper content of 250 ppm or less, and a manganese content of 1,000 ppm or less.

3. The method for producing an electrode according to claim 2, wherein the electrode is used to produce nitrogen trifluoride.

4. The method for producing an electrode according to claim 1, wherein the electrode is obtained by electrodepositing the nickel component that has been deposited on the cathode in the nitrogen trifluoride production process, onto a nickel base material by electrolytic nickel plating.

5. The method for producing an electrode according to claim 1, wherein the electrode is used to produce nitrogen trifluoride.

6. The method for producing an electrode according to claim 1 by disposing a nickel base material in a nickel plating bath as a cathode and applying nickel plating to the nickel base material by electrolytic nickel plating, the method comprising (1) or (2) below:
    (1) using, as a nickel component that is arranged in the nickel plating bath as an anode,
        a nickel component that has been deposited on a cathode in a process of producing nitrogen trifluoride by molten salt electrolysis with use of an anode containing nickel as a base material, or a nickel base material electrode that has been used as the anode in the nitrogen trifluoride production process; and
    (2) using, as the nickel base material that is arranged in the nickel plating bath as the cathode, the nickel base material electrode that has been used as the anode in the process of producing nitrogen trifluoride by molten salt electrolysis.

7. The method for producing an electrode according to claim 6, wherein a nickel base material electrode is used as the cathode in the process of producing nitrogen trifluoride, and
    a nickel component that has been deposited on the cathode is used in the nickel plating.

8. The method for producing an electrode according to claim 7, wherein, in the nickel plating, a pH of the plating bath is set to be from 1.0 to 5.0, and a current density is set to be from 1.0 to 6.0 A/dm².

9. The method for producing an electrode according to claim 7, wherein, in the nickel plating, a fluorine ion concentration in the plating bath is 10 g/L or less.

10. The method for producing an electrode according to claim 6, wherein, in the nickel plating, a pH of the plating bath is set to be from 1.0 to 5.0, and a current density is set to be from 1.0 to 6.0 A/dm².

11. The method for producing an electrode according to claim 10, wherein, in the nickel plating, a fluorine ion concentration in the plating bath is 10 g/L or less.

12. The method for producing an electrode according to claim 6, wherein, in the nickel plating, a fluorine ion concentration in the plating bath is 10 g/L or less.

13. A method for producing the electrode according to claim 1 which is a regenerated electrode by regenerating a nickel base material electrode which has been used as an anode in order to fluorinate a compound by electrolysis and in which nickel has been worn, the method comprising the steps of:
    recovering a nickel component out of a molten salt, the nickel component having been deposited on a cathode in a process of producing nitrogen trifluoride by molten salt electrolysis with use of an anode containing nickel as a base material; and
    electrodepositing the recovered nickel component onto a surface of the worn nickel base material electrode to thereby regenerate the nickel base material electrode.

14. A method for producing a regenerated electrode, the method comprising the steps of:
    using, as an anode in producing nitrogen trifluoride by molten salt electrolysis, an electrode that is regenerated using the production method according to claim 13, and recovering a nickel component that has been deposited on a cathode during the production of nitrogen trifluoride out of the molten salt; and
    electrodepositing the recovered nickel component onto a surface of the electrode that has been worn after the regeneration, to thereby regenerate the electrode.

15. A method for producing an electrode, the electrode being a regenerated electrode which is regenerated using the production method according to claim 10, wherein a mass of the regenerated electrode after the regeneration is larger than a mass of the worn nickel base material electrode prior to the regeneration by 10 mass % or more.

16. The method for producing the electrode according to claim 13, wherein the regenerated electrode is regenerated using the production method according to claim 13, wherein a mass of the regenerated electrode after the regeneration is larger than a mass of the worn nickel base material electrode prior to the regeneration by 10 mass % or more.

17. The method for producing an electrode according to claim 1, the method comprising subjecting, to electrolytic nickel plating, (i) a nickel component that has been deposited on a cathode in a process of producing nitrogen trifluoride by molten salt electrolysis with use of an anode containing nickel as a base material.

* * * * *